US008720780B2

(12) United States Patent
Brown et al.

(10) Patent No.: US 8,720,780 B2
(45) Date of Patent: May 13, 2014

(54) SYSTEMS, DEVICES, AND METHODS FOR DISPLAYING A BARCODE AT A COMPUTING DEVICE

(75) Inventors: Michael S. Brown, Waterloo (CA); Herbert A. Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1020 days.

(21) Appl. No.: 12/420,360

(22) Filed: Apr. 8, 2009

(65) Prior Publication Data
US 2010/0259549 A1 Oct. 14, 2010

(51) Int. Cl.
G06K 7/10 (2006.01)

(52) U.S. Cl.
USPC .................................... 235/462.01

(58) Field of Classification Search
USPC .............. 235/462.01, 462.04, 462.18, 472.01
See application file for complete search history.

(56) References Cited

U.S. PATENT DOCUMENTS

| 6,012,102 | A | 1/2000 | Shachar |
| 6,061,064 | A | 5/2000 | Reichlen |
| 6,070,805 | A * | 6/2000 | Kaufman et al. ............. 235/494 |
| 6,082,620 | A | 7/2000 | Bone, Jr. |
| 6,353,436 | B1 | 3/2002 | Reichlen |
| 6,685,093 | B2 | 2/2004 | Challa et al. |
| 6,783,071 | B2 | 8/2004 | Levine et al. |
| 6,845,097 | B2 | 1/2005 | Haller et al. |
| 6,978,118 | B2 | 12/2005 | Vesikivi et al. |
| 7,035,630 | B2 | 4/2006 | Knowles |
| 7,103,359 | B1 | 9/2006 | Heinonen et al. |
| 7,107,010 | B2 | 9/2006 | Heinonen et al. |
| 7,306,153 | B2 | 12/2007 | Chong et al. |
| 7,389,928 | B2 | 6/2008 | Lubow |
| 7,407,107 | B2 | 8/2008 | Engestrom et al. |
| 7,430,581 | B2 | 9/2008 | Yach et al. |
| 7,546,956 | B2 | 6/2009 | Adams et al. |
| 7,548,915 | B2 | 6/2009 | Ramer et al. |
| 7,742,953 | B2 | 6/2010 | King et al. |
| 7,769,345 | B2 | 8/2010 | Johnson et al. |
| 7,778,802 | B2 | 8/2010 | O'Flaherty et al. |
| 7,912,426 | B2 | 3/2011 | Masera et al. |

(Continued)

FOREIGN PATENT DOCUMENTS

| CA | 2714832 | 4/2011 |
| CA | 2732568 | 8/2011 |

(Continued)

OTHER PUBLICATIONS

European Search and Examination Report. Application No. 09157668.6. Dated: Aug. 31, 2009.

(Continued)

Primary Examiner — Daniel Hess
(74) Attorney, Agent, or Firm — Bereskin & Parr LLP/S.E.N.C.R.L., s.r.l.

(57) ABSTRACT

Embodiments of the systems, devices, and methods described herein generally facilitate the display of a barcode at a computing device for capture by another computing device. In accordance with one example embodiment, a barcode is generated at a first computing device, the barcode is displayed on a display screen associated with the first computing device, and one or more display properties of the barcode are dynamically modified while it is displayed at the first computing device until the barcode is successfully captured (e.g. by a camera) at a second computing device.

26 Claims, 11 Drawing Sheets

(56) References Cited

U.S. PATENT DOCUMENTS

| | | | |
|---|---|---|---|
| 7,941,665 B2 | 5/2011 | Berkema et al. | |
| 7,969,286 B2 | 6/2011 | Adelbert | |
| 7,988,037 B2 | 8/2011 | Yach | |
| 8,171,292 B2 | 5/2012 | Brown et al. | |
| 8,214,645 B2 | 7/2012 | Brown et al. | |
| 8,342,407 B2 | 1/2013 | Williams et al. | |
| 2003/0050009 A1 | 3/2003 | Kurisko et al. | |
| 2003/0057284 A1* | 3/2003 | Challa et al. | 235/462.46 |
| 2004/0258275 A1 | 12/2004 | Rhoads | |
| 2005/0015618 A1 | 1/2005 | Schneider et al. | |
| 2005/0059393 A1 | 3/2005 | Knowles | |
| 2005/0164693 A1 | 7/2005 | Yach et al. | |
| 2005/0248471 A1* | 11/2005 | Ryu | 341/1 |
| 2005/0277405 A1 | 12/2005 | Noguchi | |
| 2006/0065712 A1 | 3/2006 | Ozaki et al. | |
| 2006/0065733 A1 | 3/2006 | Lee et al. | |
| 2006/0094354 A1 | 5/2006 | Munje et al. | |
| 2006/0135064 A1 | 6/2006 | Cho et al. | |
| 2006/0174121 A1 | 8/2006 | Omae et al. | |
| 2006/0178916 A1 | 8/2006 | Domnin | |
| 2006/0274952 A1* | 12/2006 | Nakai | 382/232 |
| 2007/0027964 A1 | 2/2007 | Herrod et al. | |
| 2007/0038516 A1 | 2/2007 | Apple et al. | |
| 2007/0101403 A1 | 5/2007 | Kubler | |
| 2007/0123166 A1 | 5/2007 | Sheynman et al. | |
| 2007/0136202 A1 | 6/2007 | Noma et al. | |
| 2007/0192872 A1 | 8/2007 | Rhoads et al. | |
| 2008/0014984 A1 | 1/2008 | Brown et al. | |
| 2008/0057868 A1 | 3/2008 | Chang | |
| 2008/0081666 A1 | 4/2008 | Masera et al. | |
| 2008/0082646 A1 | 4/2008 | Shenfield et al. | |
| 2008/0191025 A1 | 8/2008 | Harris | |
| 2008/0268776 A1 | 10/2008 | Amendola | |
| 2008/0272905 A1 | 11/2008 | Higaki et al. | |
| 2008/0293367 A1 | 11/2008 | Wulff et al. | |
| 2008/0302872 A1 | 12/2008 | Tate | |
| 2008/0305776 A1 | 12/2008 | Yach et al. | |
| 2009/0089581 A1 | 4/2009 | Bishop et al. | |
| 2009/0121012 A1 | 5/2009 | Beemer et al. | |
| 2009/0176505 A1 | 7/2009 | Van Deventer et al. | |
| 2009/0282124 A1 | 11/2009 | Rauhala et al. | |
| 2010/0213251 A1 | 8/2010 | Hvidtfeldt | |
| 2010/0222041 A1 | 9/2010 | Dragt | |
| 2010/0259549 A1 | 10/2010 | Brown et al. | |
| 2010/0320266 A1 | 12/2010 | White | |
| 2011/0016413 A1 | 1/2011 | Kalu | |
| 2011/0081860 A1 | 4/2011 | Brown et al. | |
| 2011/0210171 A1 | 9/2011 | Brown et al. | |
| 2012/0054589 A1 | 3/2012 | Berger et al. | |

FOREIGN PATENT DOCUMENTS

| | | |
|---|---|---|
| CN | 101180636 | 5/2008 |
| DE | 102005001723 | 7/2006 |
| EP | 1538787 | 6/2005 |
| EP | 2040228 | 3/2009 |
| EP | 2073515 | 6/2009 |
| EP | 2 239 686 | 10/2010 |
| EP | 2 306 692 | 4/2011 |
| EP | 2364043 | 7/2011 |
| FR | 2867650 | 9/2005 |
| FR | 2906667 | 4/2008 |
| WO | 92/01258 | 1/1992 |
| WO | 02056536 | 7/2002 |
| WO | 2005/002174 | 1/2005 |
| WO | 2008040004 | 4/2008 |

OTHER PUBLICATIONS

European Communication under Rule 71(3) EPC. European Application No. 09157668.6. Dated: Dec. 1, 2011.
Co-pending U.S. Appl. No. 12/572,386, "Methods and Devices for Facilitating Bluetooth Pairing Using a Camera as a Barcode Scanner", filed Oct. 2, 2009.
Borchert, Bernd, "Fotohandy—PIN: Secure Online Passwords via Camera Mobile Phone", Dec. 30, 2008. Retrieved from the Internet: http://www-fs.informatik.uni-tuebingen.de/studdipl/Fotohandy-PIN/Info-Blaetter/Infor_E_Foto-PIN.pdf.
Research in Motion Limited, "BlackBerry Wireless Enterprise Activation", Release 4.0, Technical Overview, 2004.
Rahman, Sumair Ur, "Security for Rural Public Computing", A thesis presented to the University of Waterloo in fulfillment of the thesis requirement for the degree of Master of Mathematics in Computer Science, Waterloo, Ontario, Canada 2008.
Code Corporation, "QuickConnect Codes for Bluetooth Devices", Retrieved from Internet [Mar. 13, 2009]: http://www.codecorp.com/bdaddr.php.
Lxe, "Bar Code Scanners", Retrieved from Internet [Mar. 13, 2009]: http://www.lxe.com/us/products/barcode.aspx?id=1054.
Im, Seunghyun, "Validating Secure Connections between Wireless Devices in Pervasive Computing Using Data Matrix", 2008 International Conference on Multimedia and Ubiquitous Engineering, Retrieved from Internet [Mar. 13, 2009]: http://ieeexplore.ieee.org/stamp/stamp.jsp?arnumber=4505718&isnumber=4505671.
Claycomb, William R. and Shin, Dongwan, "Secure Real World Interaction Using Mobile Devices", Retrieved from Internet [date unknown]: http://www.medien.ifi.lmu.de/permid2006/pdf/Claycomb Permid2006.pdf.
Saxena, Nitesh et al., "Secure Device Pairing Based on a Visual Channel", Retrieved from Internet [date unknown]: http://eprint.iacr.org/2006/050.pdf.
Claycomb, W. and Shin, Dongwan, "Using a Two Dimensional Colorized Barcode Solution for Authentication in Pervasive Computing", IEEE Xplore, Retrieved from Internet [Mar. 13, 2009]: http://ieeexplore.ieee.org/xpls/abs_all.jsp?tp=&arnumber=1652222&isnumber=34634.
McCune, Jonathan M. et al., "Seeing-Is-Believing: Using Camera Phones for Human-Verifiable Authentication", 2005 IEEE Symposium on Security and Privacy, Retrieved from Internet [date unknown]: http://www.ece.cmu.edu/~jmmccune/papers/mccunej_believing.pdf.
Suri, Pushpa R. and Rani, Sona, "Bluetooth Authentication and Personal Identification Number Estimation by Attacker", Information Technology Journal 6 (6), pp. 938-940, 2007.
Palm, "Bluetooth Pairing: definition and overview", 2009 Palm, Inc. Bluetooth, "Connecting your Devices" [date unknown].
Managoli, Girish, "Implementing Solid Security on a Bluetooth Product", EE Times—India [date unknown].
Co-pending U.S. Appl. No. 12/504,907, "Method and Apparatus for Sharing Calendar Databases", filed Jul. 17, 2009
Amendment. U.S. Appl. No. 12/713,217. Dated: Dec. 16, 2011.
United States Office Action. U.S. Appl. No. 12/713,217. Dated: Sep. 21, 2011.
"Barcodes in Flash. Dynamically generating UPC barcodes using Actionscript." http://www.codeofpaint.com/?q=node/17.
Co-pending U.S. Appl. No. 12/713,217, "Methods and Devices for Transmitting and Receiving Data used to Activate a Device to Operate with a Server", filed Feb. 26, 2010.
Response. European Patent Application 09157668.6. Dated: Oct. 28, 2009.
Decision to grant a European patent pursuant to Article 97(1) EPC. European Patent Application 09157668.6. Dated: Apr. 19, 2012.
Office Action. Co-pending U.S. Appl. No. 12/572,386. Dated: Mar. 13, 2012.
Amendment. Co-pending U.S. Appl. No. 12/572,386. Dated: Jun. 12, 2012.
Office Action. Co-pending U.S. Appl. No. 12/504,907. Dated: Mar. 20, 2012.
Amendment. Co-pending U.S. Appl. No. 12/504,907. Dated: May 16, 2012.
Final Office Action. Co-pending U.S. Appl. No. 12/713,217. Dated: Feb. 28, 2012.
Response After Final. Co-pending U.S. Appl. No. 12/713,217. Dated: Apr. 26, 2012.
Advisory Action. Co-pending U.S. Appl. No. 12/713,217. Dated: May 7, 2012.

(56) References Cited

OTHER PUBLICATIONS

Interview Summary. Co-pending U.S. Appl. No. 12/713,217. Dated: May 24, 2012.
Amendment. Co-pending U.S. Appl. No. 12/713,217. Dated: Jun. 11, 2012.
Request for Continued Examination. Co-pending U.S. Appl. No. 12/713,217. Dated: Jun. 11, 2012.
Canadian Office Action. Canadian Application No. 2,698,799. Dated: Oct. 22, 2012.
Chinese Office Action. Chinese Application No. 201010162146.8. Dated: Oct. 9, 2012.
Office Action. Co-pending U.S. Appl. No. 12/572,386. Dated: Oct. 25, 2012.
Amendment. Co-pending U.S. Appl. No. 12/572,386. Dated: Jan. 25, 2013.
Final Office Action. Co-pending U.S. Appl. No. 12/504,907. Dated: Oct. 9, 2012.
Amendment after Final. Co-pending U.S. Appl. No. 12/504,907. Dated: Dec. 7, 2012.
Advisory Action. Co-pending U.S. Appl. No. 12/504,907. Dated: Dec. 19, 2012.
Request for Continued Examination (RCE). Co-pending U.S. Appl. No. 12/504,907. Dated: Jan. 8, 2013.
Canadian Office Action. Canadian Patent Application No. 2,698,799. Dated: Jul. 11, 2013.
Chinese Office Action. Chinese Patent Application No. 201010162146.8. Dated: Jun. 20, 2013.
United States Office Action. U.S. Appl. No. 12/572,386. Dated: Apr. 5, 2013.
Amendment. U.S. Appl. No. 12/572,386. Dated: Jul. 3, 2013.
United States Office Action. U.S. Appl. No. 12/504,907. Dated: Mar. 14, 2013.
Amendment. U.S. Appl. No. 12/504,907. Dated: Jun. 6, 2013.
Office Action. Chinese Patent Application No. 201010162146.8. Dated: Dec. 12, 2013.
Office Action. U.S. Appl. No. 12/572,386. Dated: Sep. 6, 2013.
Amendment. U.S. Appl. No. 12/572,386. Dated: Dec. 5, 2013.
Final Office Action. U.S. Appl. No. 12/504,907. Dated: Sep. 25, 2013.
Amendment after Final. U.S. Appl. No. 12/504,907. Dated: Dec. 10, 2013.
Notice of Allowance. U.S. Appl. No. 12/504,907. Dated: Jan. 7, 2014.
Applicant-Initiated Interview Summary. U.S. Appl. No. 12/504,907. Dated: Jan. 7, 2014.
Notice of Allowance. U.S. Appl. No. 12/572,386. Dated: Mar. 14, 2014.

* cited by examiner

SYSTEMS, DEVICES, AND METHODS FOR DISPLAYING A BARCODE AT A COMPUTING DEVICE

FIELD

Embodiments described herein relate generally to the display of a barcode at a computing device, and more specifically to the display of a barcode at a computing device for capture by another computing device.

BACKGROUND

A barcode is an optical representation of data, as known in the art. For example, a typical "1-dimensional" barcode may be represented by a series of lines of varying widths and spacing. As a further example, a "2-dimensional" barcode may be represented by squares, dots, hexagons or other geometric patterns. A barcode may be a black-and-white barcode. Alternatively, a barcode may be a color barcode.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
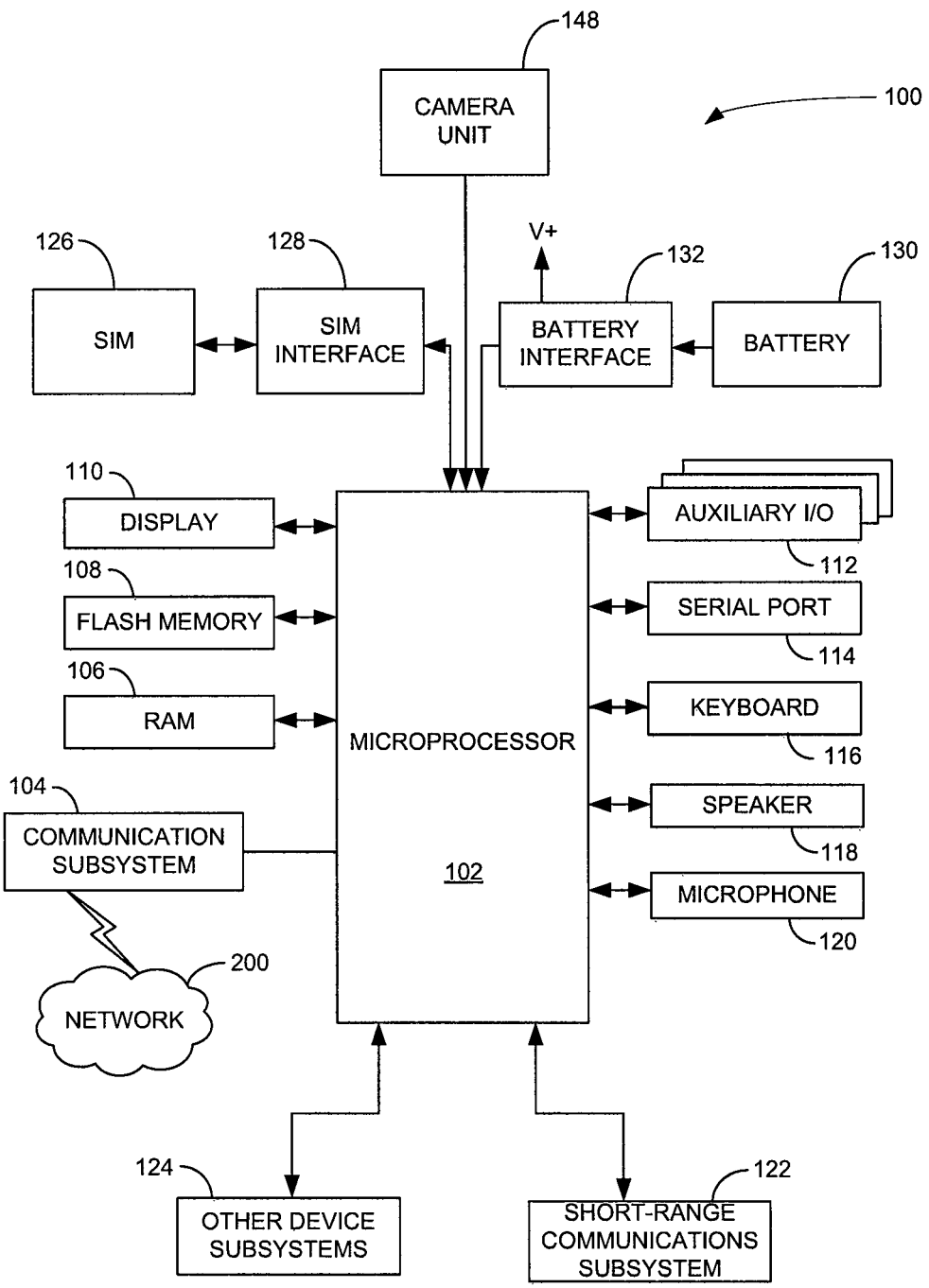
FIG. 1 is a block diagram of a mobile device in one example implementation.
Figure 2:
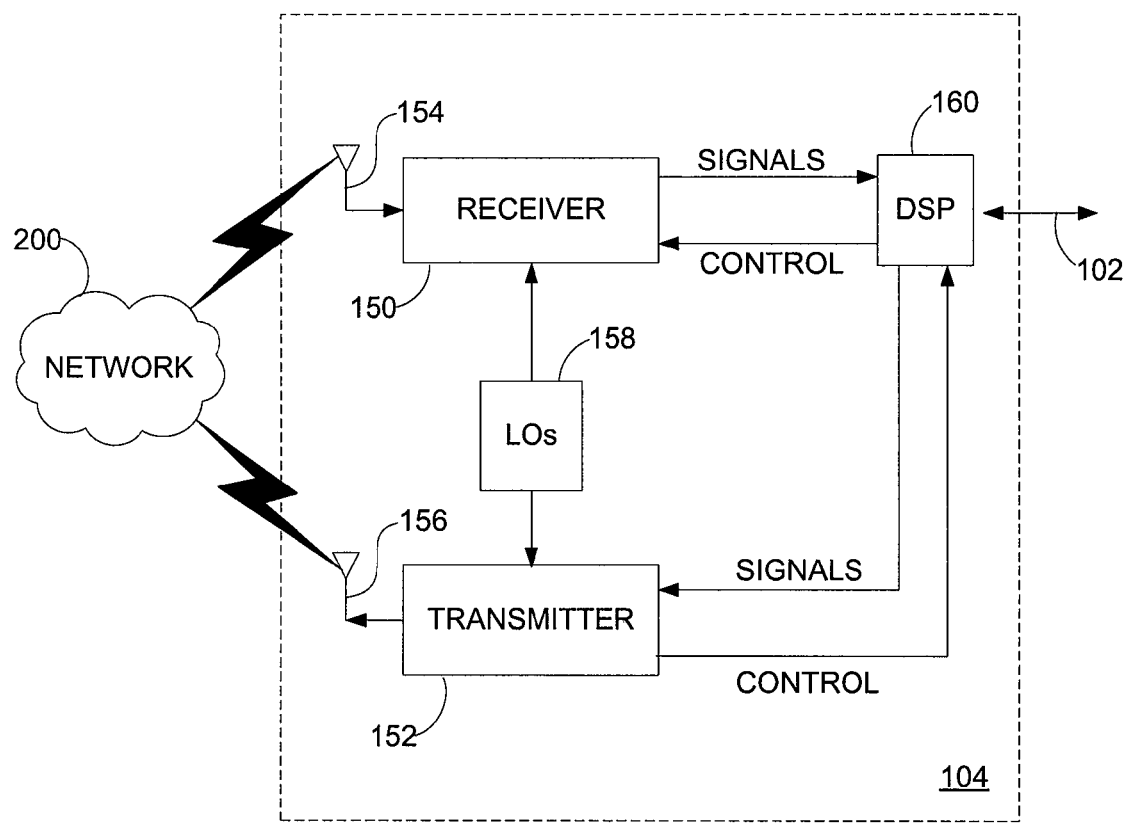
FIG. 2 is a block diagram of a communication subsystem component of the mobile device of FIG. 1.
Figure 3:
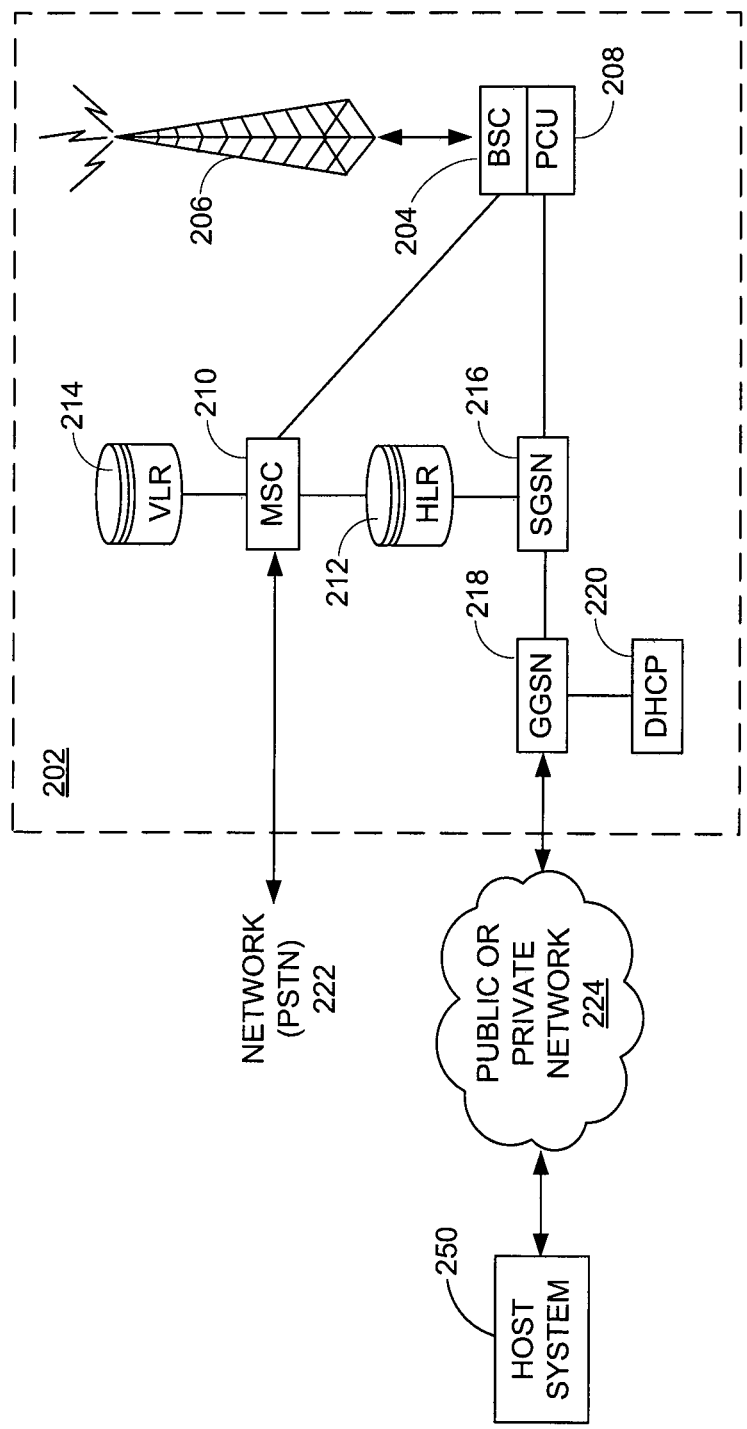
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behavior described herein, and it will also be understood by persons skilled in the art that the embodiments of the present disclosure are intended to use any other suitable standards that are developed in the future. The wireless link connecting communication subsystem 104 with network 200 may represent one or more different Radio Frequency (RF) channels, operating according to defined protocols specified for GSM/GPRS communications. With newer network protocols, these channels may be capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, camera unit 148, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will understand that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 (or e.g. USIM for UMTS, or CSIM or RUIM for CDMA) to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including date book (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM may have functionality to organize and manage data items of interest to a subscriber, such as, but not limited to, e-mail, calendar events, voice mails, appointments, and task items. A PIM application may have the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 may enable a subscriber to set preferences through an external device or software application, and extend the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 may provide for communication between mobile device 100 and different systems or devices, without the use of network 200. For example, subsystem 122 may include an infrared device and associated circuits and components for short-range communication. Examples of short-range communication include standards developed by the Infrared Data Association (IrDA), Bluetooth®, and the 802.11 family of standards (Wi-Fi®) developed by IEEE.

In use, a received signal such as a text message, an e-mail message, or web page download may be processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output may be accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 may be dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 may also contain a Packet Control Unit (PCU) 208 that connects to SGSN 216 to control segmentation, radio channel allocation and to satisfy packet switched requirements. To track mobile device location and availability for both circuit switched and packet switched management, HLR 212 may be shared between MSC 210 and SGSN 216. Access to VLR 214 may be controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 may be responsible for a group of location areas, and may store the data of the mobile devices currently in its area of responsibility in VLR 214. Further, VLR 214 may also contain information on mobile devices that are visiting other networks. The information in VLR 214 may include part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 may have similar responsibilities within wireless network 200 by keeping track of the location of each mobile device 100. SGSN 216 also performs security functions and access control for data traffic on network 200. GGSN 218 may provide internetworking connections with external packet switched networks and connect to one or more SGSNs 216 via an Internet Protocol (IP) backbone network operated within the network 200. During normal operations, a given mobile device 100 may perform a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, using a DHCP server 220 connected to the GGSN 218. There are many mechanisms for dynamic IP assignment, including the use of a combination of a Remote Authentication Dial-In User Service (RADIUS) server and a DHCP server, for example. Once the GPRS Attach is complete, a logical connection may be established from a mobile device 100, through PCU 208, and SGSN 216 to an Access Point Node (APN) within GGSN 218, for example. The APN may represent a logical end of an IP tunnel that can either access direct Internet compatible services or private network connections. The APN may also represent a security mechanism for network 200, insofar as each mobile device 100 is assigned to one or more APNs, and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel may be created and all traffic exchanged within standard IP packets using any protocol that can be supported in IP packets. This may include tunneling methods such as IP over IP as in the case with some IPSecurity (IPsec) connections used with Virtual Private Networks (VPN). These tunnels are also referred to as Packet Data Protocol (PDP) Contexts and there may be a limited number of these available in the network 200. To maximize use of the PDP Contexts, network 200 will run an idle timer for each PDP Context to determine if there is a lack of activity. When a mobile device 100 is not using its PDP Context, the PDP Context may be deallocated and the IP address returned to the IP address pool managed by DHCP server 220.

Figure 4:
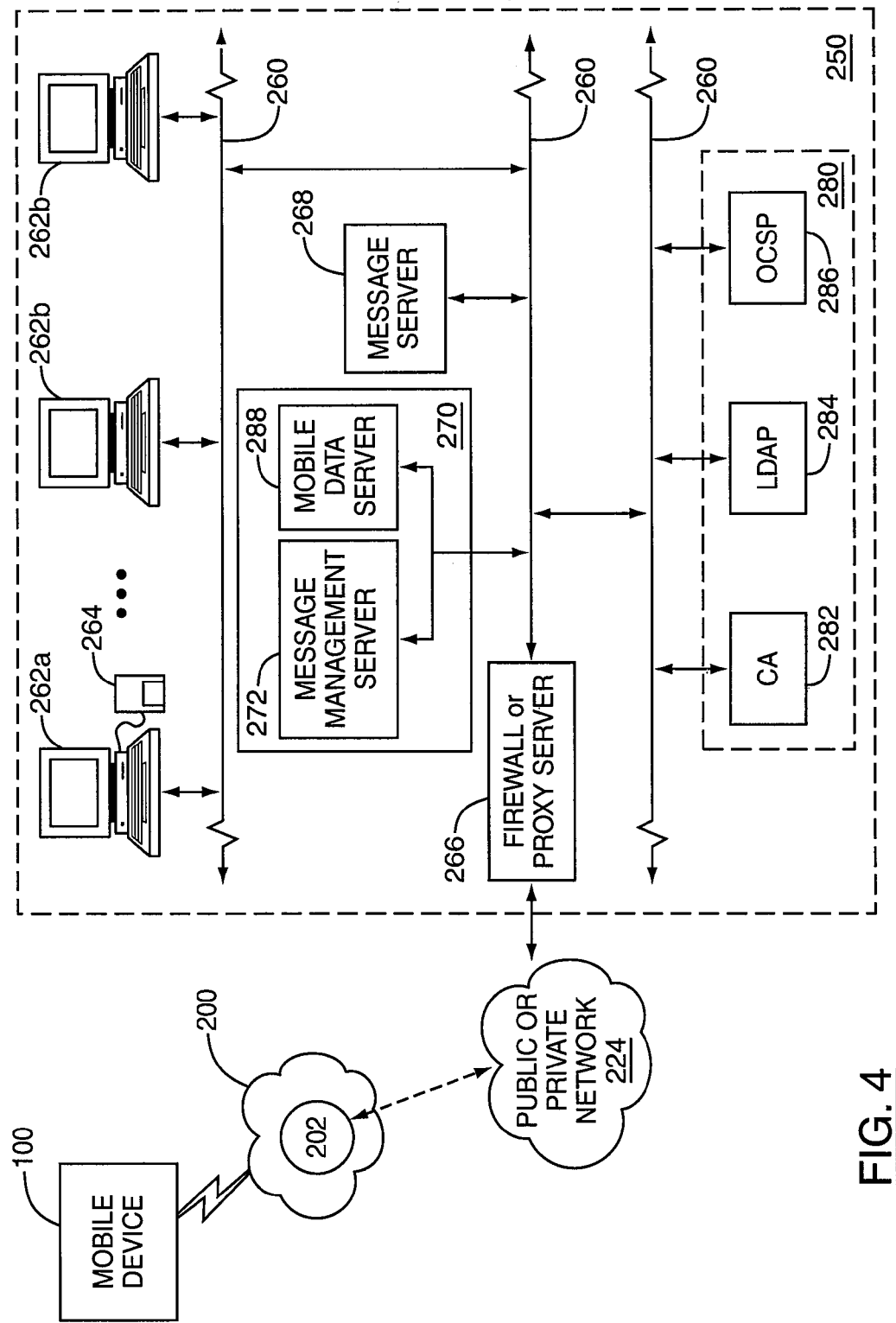
FIG. 4 is a block diagram illustrating components of a host system in one example implementation.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 may be situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates, often performed when initializing mobile device 100 for use. The information downloaded to mobile device 100 may include S/MIME certificates or PGP keys used in the exchange of messages, for example.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol may provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 may be initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be configured to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the mobile device 100. An e-mail client application operating on mobile device 100 may request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 may be automatically redirected to mobile device 100 as the message server 268 receives those messages.

To facilitate the wireless communication of messages and message-related data between mobile device 100 and components of LAN 250, a number of wireless communications support components 270 may be provided. In this example implementation, wireless communications support components 270 may comprise a message management server 272, for example. Message management server 272 may be used to specifically provide support for the management of messages, such as e-mail messages, that are to be handled by mobile devices. Generally, while messages are still stored on message server 268, message management server 272 may be used to control when, if, and how messages should be sent to mobile device 100. Message management server 272 may also facilitate the handling of messages composed on mobile device 100 that are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 is permitted to receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be configured to provide other control functions, such as only pushing certain message information or pre-defined portions (e.g. "blocks") of a message stored on message server 268 to mobile device 100. For example, when a message is initially retrieved by mobile device 100 from message server 268, message management server 272 is configured to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 may facilitate better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices are supported.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 may be configured to store public keys (e.g. in S/MIME certificates, PGP keys) of other individuals. Keys stored on a user's computer 262a may be downloaded from computer 262a to mobile device 100 through cradle 264, for example.

Mobile device 100 may also be configured to store the private key of a public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100) in a key store, for example. The sources of these certificates and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 may include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be configured to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

Barcodes are optical representations of data. Barcodes are commonly provided as images printed on physical media, to be subsequently read using a scanning device that is configured to capture the images for further processing (e.g. by appropriate software and/or hardware coupled to the scanning device). In the course of further processing, the data represented by the barcode is decoded.

In implementations of at least one embodiment described herein, a barcode is displayed as an image on a display (e.g. display 110 of FIG. 1) of a first computing device (e.g. mobile device 100 of FIG. 1), to be subsequently read using a camera or other similar hardware component of a second computing device (e.g. a second mobile device similar to mobile device 100 of FIG. 1). Further processing is subsequently performed at the second computing device (e.g. by appropriate software and/or hardware), so that the data represented by the barcode can be decoded. Accordingly, the barcode provides a medium for the transmission of data from the first computing device to the second computing device.

Depending on the desired application, different types of data may be transmitted from the first computing device to the second computing device. For example, barcodes may be used to facilitate the secure transmittal of security parameters (e.g. a PIN and/or a password) from the first computing device to the second computing device.

Figure 5:
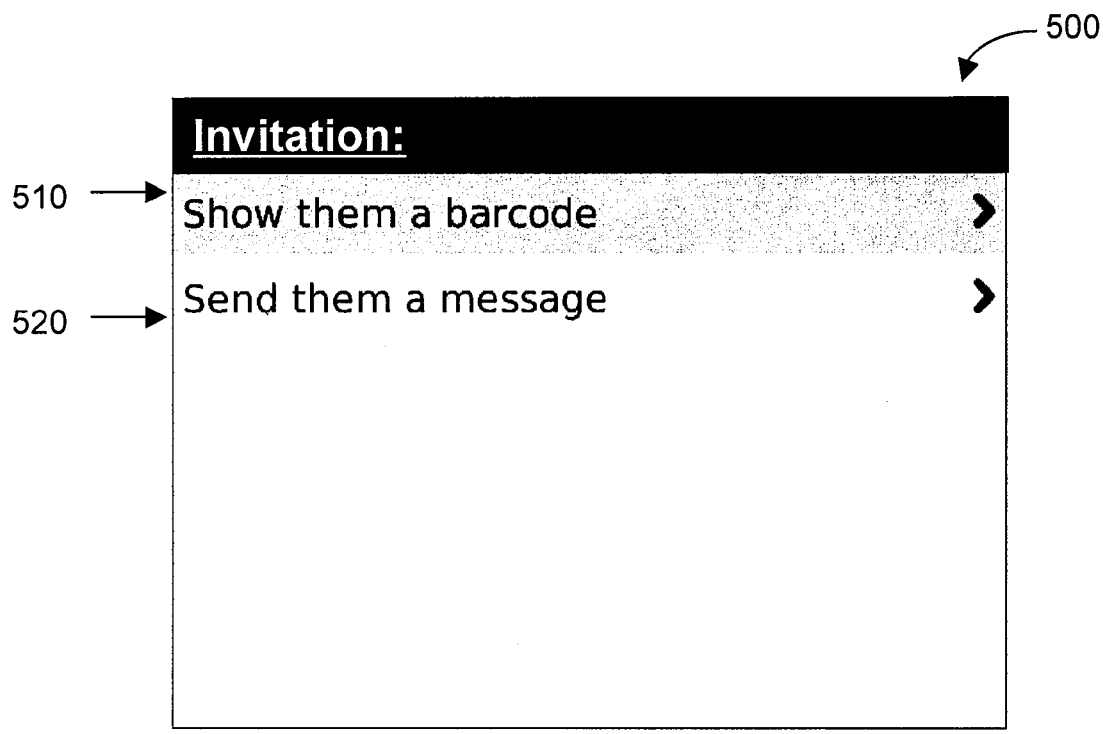
FIG. 5 is an example screen capture of the display of a computing device prompting a user with a menu option to generate a barcode in an example implementation.
Figure 6:
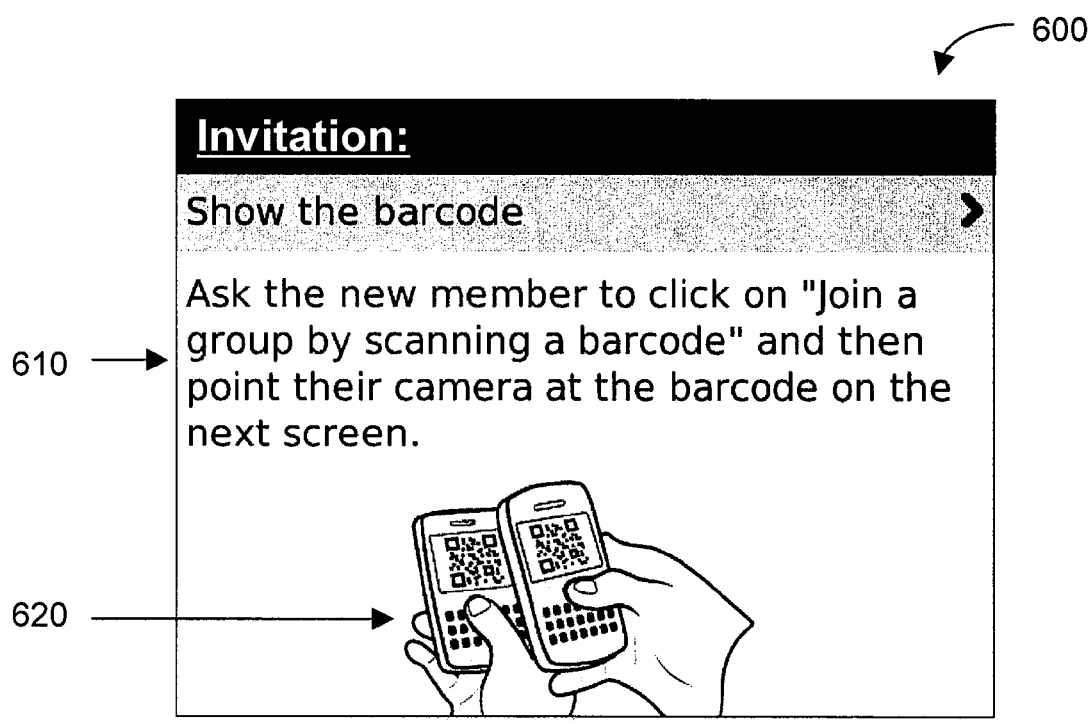
FIG. 6 is an example screen capture of the display of a computing device wherein a user has selected a menu option to generate a barcode in the example implementation.
Figure 7:
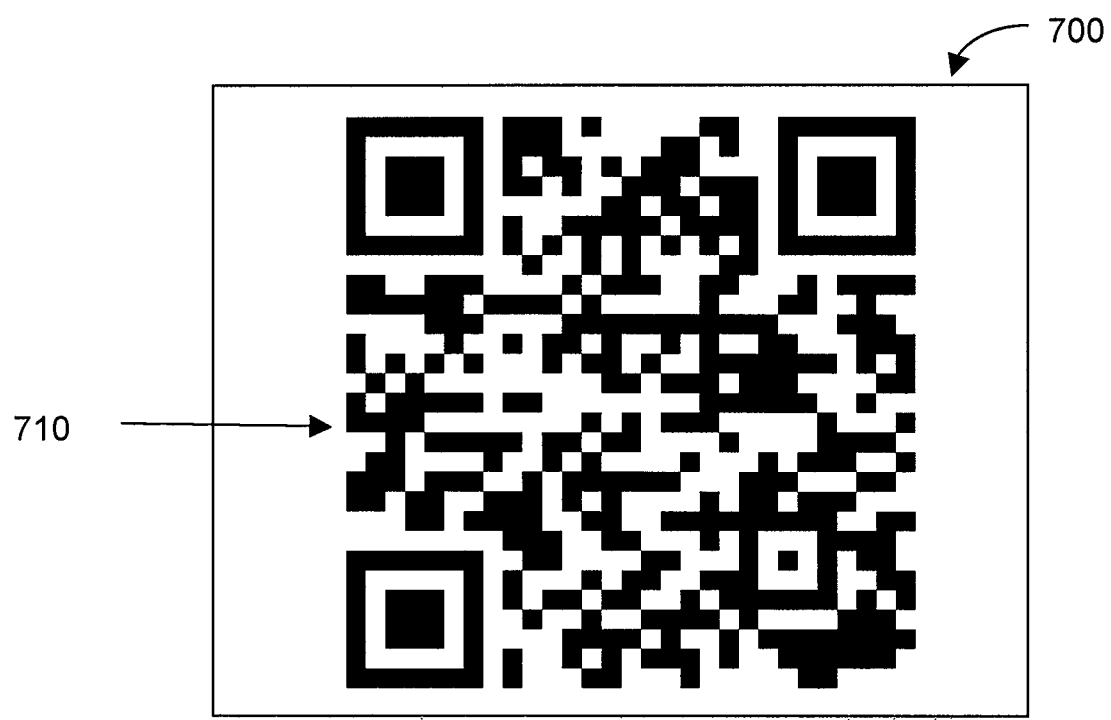
FIG. 7 is an example screen capture of the display of a computing device as it displays a barcode for transmission to one other computing device in the example implementation.
Figure 8:
FIG. 8 is an example screen capture of the display of the other computing device prompting a user with a menu option to capture the barcode of FIG. 7 in the example implementation.
Figure 9:
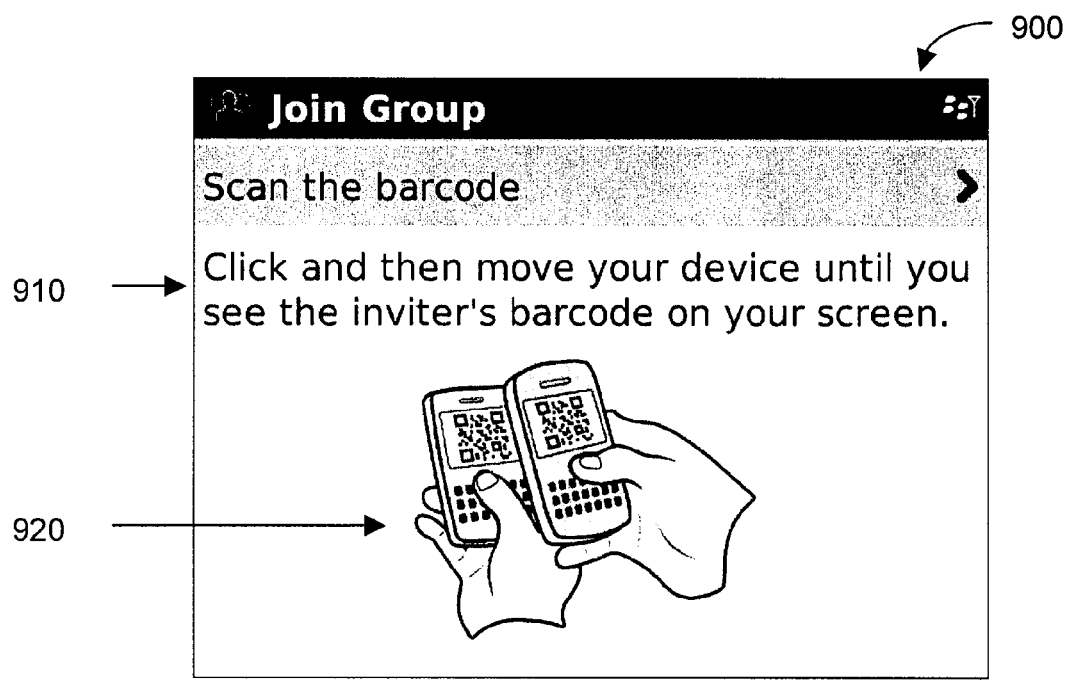
FIG. 9 is an example screen capture of the display of the other computing device as it instructs a user on how to capture the barcode of FIG. 7 in the example implementation.
Figure 10:
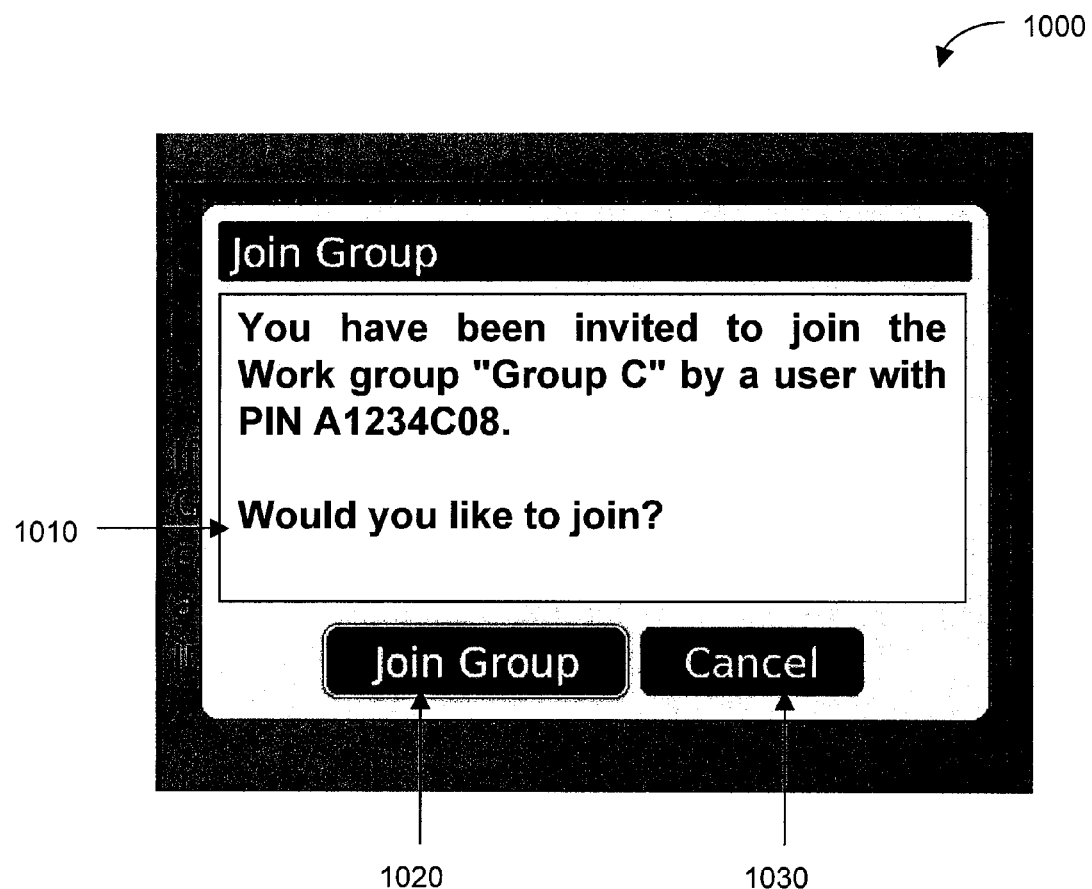
FIG. 10 is an example screen capture of the display of the other computing device after capturing the barcode of FIG. 7 in the example implementation.

By way of illustration, FIGS. 5 to 7 are example screen captures of a display of the first computing device configured to transmit security parameters to the second computing device. FIGS. 8 to 10 are example screen captures of a display of the second computing device configured to receive security parameters from the first computing device.

The example implementation illustrated with reference to FIGS. 5 to 10 is described as an illustration only, and persons skilled in the art will understand that data other than security parameters may be transmitted in variant implementations, in accordance with at least one embodiment as described herein.

FIG. 5 is an example screen capture 500 of the display of a first computing device prompting a user with a menu option to generate either a barcode or an e-mail message. For example, in the user interface 500, the user may select a first menu option 510, "Show them a barcode", to generate a barcode, or a second menu option 520, "Send them a message".

FIG. 6 is an example screen capture 600 of the display of the first computing device wherein a user has selected the menu option 510 of FIG. 5 to generate a barcode. For example, a user interface of the first computing device may provide instructional text 610 and/or instructional diagrams 620 to instruct a user to transmit the barcode from the first computing device to the second computing device.

FIG. 7 is an example screen capture 700 of the display of the first computing device as it displays a barcode 710 (which encodes data comprising security parameters in this example) for transmission to the second computing device.

FIG. 8 is an example screen capture 800 of the display of the second computing device prompting a user with a menu option to capture the barcode 710 of FIG. 7 displayed at the first computing device. For example, in a user interface of the second computing device, the user may select a menu option 810, "Join a group by scanning a barcode", to initiate the capture of the barcode (e.g. by a camera of the second computing device).

FIG. 9 is an example screen capture 900 of the display of the second computing device as it instructs a user on how to capture the barcode 710 of FIG. 7 displayed at the first computing device. For example, a user interface of the second computing device may provide instructional text 910 and/or instructional diagrams 920 to instruct a user on how to capture the barcode from the first computing device at the second computing device.

FIG. 10 is an example screen capture 1000 of the display of the second computing device after successfully capturing the barcode 710 of FIG. 7. In this example implementation, a dialog box 1010 with text is provided that identifies a PIN (e.g. comprising 8 hexadecimal-ASCII characters) that was transmitted via the barcode. User options 1020 and 1030 are also provided.

The present inventors recognized that in situations where a first computing device displays a barcode on its display for capture by, for example, a second computing device using its camera (or some other specialized hardware), there are a number of variables which may make it difficult to predict whether the barcode will be successfully captured by the camera or other hardware such that data can be accurately decoded from the captured barcode image. For example, a successful capture of the barcode at the second computing device may be dependent on at least one of a number of factors. Some factors may be associated with properties or settings associated with the display of the first computing device. Some factors may be associated with the ambient light level of the environment, which may cause changes in the backlight level on the display of the first computing device, or reflections on the display. Some factors may be associated with properties or settings associated with the image-capturing device (e.g. camera on the second computing device), such as resolution, focus, contrast, white balance, etc. The above-noted factors are presented as examples only.

The present inventors observed that some of these factors are dependent on properties of the display of the first computing device, while other factors are dependent on properties of the camera or other hardware of the second computing device, for example.

In respect of factors that impact the display of a barcode at the first computing device, these factors may present an even greater problem that might hinder the successful capture of the barcode at the second computing device where the first computing device is a mobile device, due to the relatively small size of mobile device displays, and the potentially large number of different environments where a mobile device may be used, for example.

Embodiments described herein are generally directed to systems, devices, and methods in which one or more properties of a barcode being displayed at the first computing device (e.g. a mobile device) are dynamically modified while the barcode is being displayed. This may increase the likelihood that the barcode will be displayed at the first computing device in a form that will allow the barcode to be successfully captured by, for example, a second computing device, even under conditions that might otherwise hinder a successful capture of the barcode.

In one broad aspect, there is provided a system, device, and method of displaying a barcode at a computing device, wherein acts of the method are performed by a processor of the computing device, and wherein the method comprises: generating a barcode for display on a display associated with the computing device; displaying the barcode on the display; generating a modified version of the barcode by modifying one or more display properties associated with the barcode; displaying the modified version of the barcode; and automatically repeating said generating the modified version and said displaying the modified version, until a signal to terminate display of the barcode is received by the processor.

In another broad aspect, the one or more display properties comprise one or more colors in at least a part of the barcode.

In another broad aspect, the barcode comprises a first plurality of cells displayed in a first color and a second plurality of cells displayed in a second color, and wherein said modifying one or more display properties associated with the barcode comprises modifying at least one of: the first color of the first plurality of cells, or the second color of the second plurality of cells.

In another broad aspect, the barcode is generated from a base pattern, and a layer having at least one modifiable property; wherein said generating the modified version of the barcode comprises modifying one or more of the at least one modifiable property of the layer, and applying the layer to the base pattern.

In another broad aspect, the at least one modifiable property of the layer comprises at least one of an opacity of the layer or a color of the layer.

In another broad aspect, the one or more of the at least one modifiable property of the layer is modified based on a value of a time-dependent mathematical function.

In another broad aspect, the time-dependent mathematical function comprises a continuous function.

In another broad aspect, the time-dependent mathematical function comprises a sine function.

In another broad aspect, the first color is associated with positive values of a time-dependent mathematical function, wherein the second color is associated with negative values of the time-dependent mathematical function, and wherein a level of opacity is associated with an absolute value of the time-dependent mathematical function.

In another broad aspect, at said repeating, the layer is modified from a transparent state to a semi-transparent state and back to the transparent state over time.

In another broad aspect, at said repeating, the layer is modified from a transparent state to a semi-transparent state in the first color, then to the transparent state, then to a semi-transparent state in the second color, and then to the transparent state over time.

In another broad aspect, the method further comprises: determining whether the signal to terminate display of the barcode is received; and terminating display of the barcode.

In another broad aspect, the signal to terminate display of the barcode is received from a second computing device.

In another broad aspect, the signal to terminate display of the barcode is received at the computing device when generated in response to a user input.

In another broad aspect, the one or more display properties comprise a display size of at least a part of the barcode.

In another broad aspect, the one or more display properties comprise an orientation of the barcode.

In another broad aspect, the computing device comprises a mobile device.

These and other aspects and features of various embodiments will be described in greater detail below.

Figure 11:
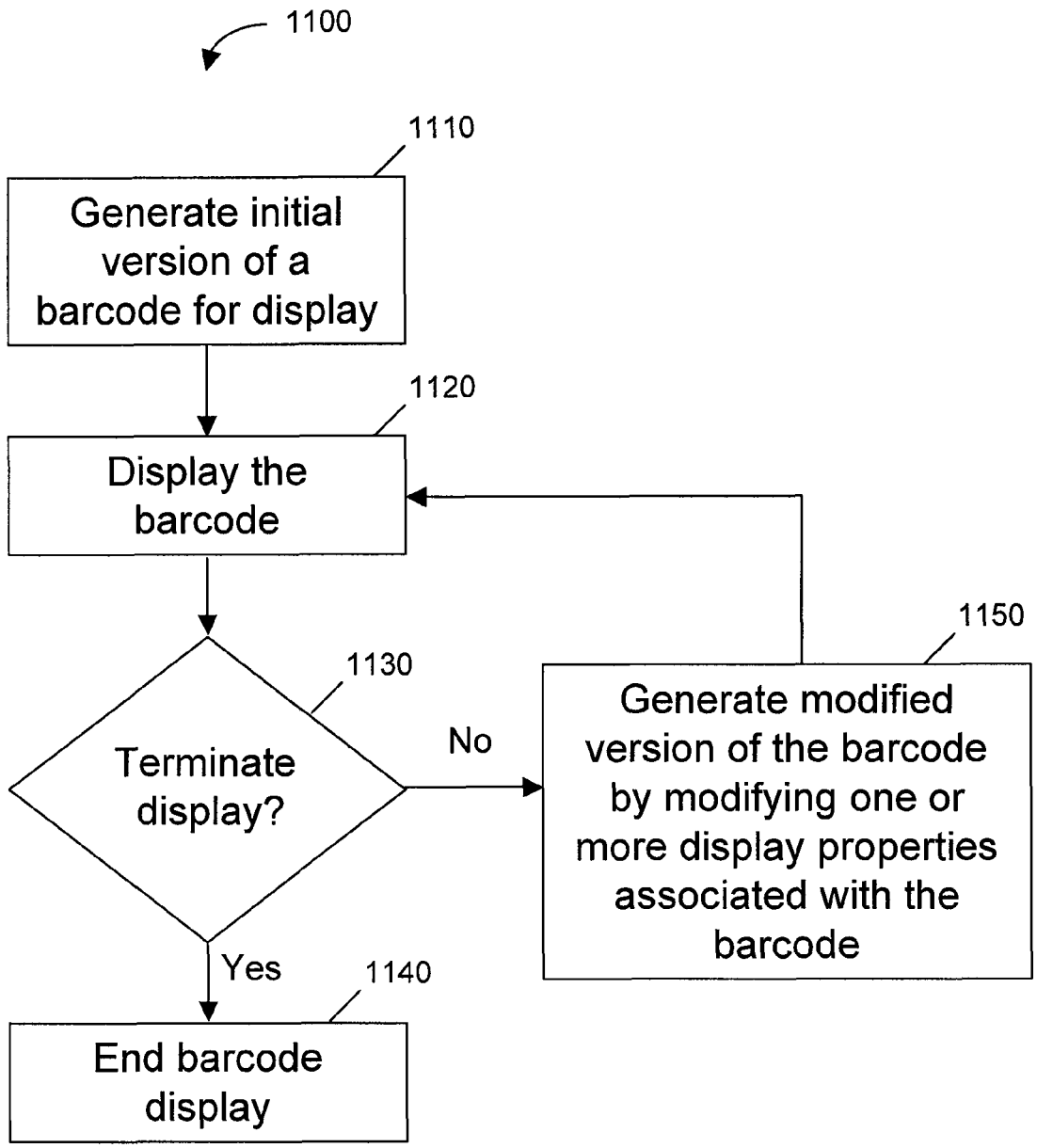
FIG. 11 is a flowchart illustrating acts of a method of displaying a barcode at a computing device, in accordance with at least one embodiment.

Reference is first made to FIG. 11, in which a flowchart illustrating acts of a method of displaying a barcode at a computing device is shown generally as 1100, in accordance with at least one embodiment.

In at least one embodiment, at least some of the acts of method 1100 are performed by a processor executing an application (e.g. comprising one or more application modules) residing on a computing device, such as a mobile device (e.g. mobile device 100 of FIG. 1). In variant embodiments, the application may reside on a computing device other than a mobile device.

At 1110, an initial version of a barcode is generated for display at the computing device. In at least one embodiment, the barcode is a 2-dimensional barcode represented by squares, dots, and/or other geometric patterns (see e.g. barcode 710 of FIG. 7). However, in variant embodiments, a different type of barcode may be generated at 1110.

In at least one embodiment, the barcode is a black-and-white barcode. For illustrative purposes, examples are described herein where the barcode is a black-and-white barcode. However, persons skilled in the art will understand that barcodes employing different color combinations may be generated in variant embodiments.

In some embodiments, the generation of the barcode at 1110 may be initiated based on user input provided via a user interface at the computing device. For example, the user of the computing device may be presented with a dialog box prompting him or her to generate the barcode, to be captured by an appropriately configured input device (e.g. a camera of another computing device). In variant embodiments, the generation of the barcode at 1110 may be automatically triggered based on some other event.

At 1120, the barcode generated at 1110 is displayed via a display associated with the computing device (e.g. display 110 of the mobile device 100 of FIG. 1). The display may either reside on the computing device itself, or it may be a physically separate display device coupled to the computing device.

By displaying the generated barcode at a display associated with the computing device ("first computing device"), information represented in the barcode may be transmitted to another computing device ("second computing device"). For example, the second computing device may capture the barcode via a camera or other optical sensing device associated with the second computing device. The camera or other optical sensing device may either reside on the second computing device itself, or it may be a physically separate device coupled to the second computing device. The camera or other optical sensing device may then be configured to provide captured data to a processor, for example, in order to decode the data represented in the barcode.

In at least one embodiment, display of the barcode at the first computing device may be facilitated by identifying an area in which the barcode is to be displayed, and partitioning the area to define an array of cells. In the example of a black-and-white barcode (see e.g. barcode 710 of FIG. 7), each of the cells in the array is displayed either in black or in white, to form a layout that causes the desired barcode to be displayed. By defining a layout comprising a plurality of black cells and a plurality of white cells, different black-and-white barcode patterns may be constructed.

More generally, the barcode displayed at 1120 may comprise at least a first plurality of cells displayed in a first color and a second plurality of cells displayed in a second color. Persons skilled in the art will understand that the barcode may comprise more than two colors in variant embodiments.

At 1130, a determination is made as to whether a signal to terminate the display of the barcode displayed at 1120 has been received by the processor of the first computing device.

In at least one embodiment, the signal to terminate display of the barcode is received from a second computing device. For example, when the barcode displayed at the first computing device has been successfully captured at a second computing device, the second computing device may transmit a signal to the first computing device (e.g. via a PIN-to-PIN or Bluetooth® channel) confirming that the barcode has been successfully captured. This signal transmitted by the second computing device may be an explicit signal to terminate the display of the barcode at the first computing device, or it may be an implicit signal from which the first computing device will understand that the barcode has been successfully captured and decoded at the second device given the subsequent communications that take place between the first and second computing devices.

In at least one embodiment, a signal to terminate the display of the barcode may also be received at the first computing device when generated in response to a user input. For example, a user of the first computing device may manually select an option to terminate the display of the barcode (e.g. via a user interface of the first computing device) to confirm that the barcode has been successfully captured at the second computing device, or to abort method 1100 (e.g. when the barcode has not been successfully captured at the second computing device).

In at least one embodiment, a signal to terminate the display of the barcode may also be received at the first computing device, the signal being automatically generated as a "timeout" signal after a pre-determined time has elapsed since the initial version of the barcode was generated at 1110.

If, at 1130, it is determined that a signal to terminate the display of the barcode is received, then the display of the barcode is terminated at 1140. Otherwise, the flow of method acts proceeds to 1150.

At 1150, a modified version of the barcode is generated by modifying one or more display properties associated with the barcode. The flow of method acts then returns to 1120, where the modified version of the barcode is displayed on the display of the first computing device.

In accordance with at least one embodiment described herein, until a signal to terminate the display of the barcode is received at the first computing device (e.g. as determined at 1130), the act of generating a modified version of the barcode at 1150 and the act of displaying the modified version of the barcode at 1120 may be continuously repeated. These acts are repeated automatically, without user intervention, in a barcode display cycle. Accordingly, the one or more display properties of the barcode are dynamically modified while it is displayed, to produce a plurality of barcode versions. The present inventors recognized that by dynamically modifying one or more display properties of a barcode while it is being displayed at a display associated with the first computing device (e.g. "cycling" through different versions of the barcode), the likelihood that the barcode will be displayed at the first computing device in a form that will allow the barcode to be successfully captured by, for example, a second computing device (e.g. a second mobile device) might be increased.

In at least one embodiment, the one or more display properties being modified at 1150 comprises one or more colors in at least a part of the barcode. For example, for two-color barcodes (e.g. black-and-white barcodes), the color of all black elements of the barcode may be changed to a different color (e.g. gray), or the color of all white elements of the barcode may be changed to a different color (e.g. gray), or both (e.g. two different gray colors), at 1150. In variant embodiments, only a strict subset of the elements of the barcode having a particular color may be modified.

In some instances (e.g. under certain lighting conditions), specific colors comprising the barcode may be more desirable than others (e.g. under some conditions, blue-and-white barcodes may be more likely to be captured than black-and-white barcodes). Generally, however, modifying the color of an element of the barcode need not require that the color be changed to a dramatically different color. For example, the color of an element of the barcode may be modified at 1150 by using a lighter or darker shade of that color.

In a variant embodiment, the one or more display properties being modified at 1150 may alternatively or additionally comprise a display size of at least a part of the barcode. For example, different sizes of the barcode may be displayed in different iterations or at different points of the barcode display cycle. This may be used to better accommodate the capabilities of different barcode capturing devices, different relative distances between the first and second computing devices, or different orientations of the first and second computing devices, for example.

In a variant embodiment, the one or more display properties being modified at 1150 may alternatively or additionally comprise an orientation of the barcode. For example, the barcode may be rotated throughout the barcode display cycle.

Figure 12:
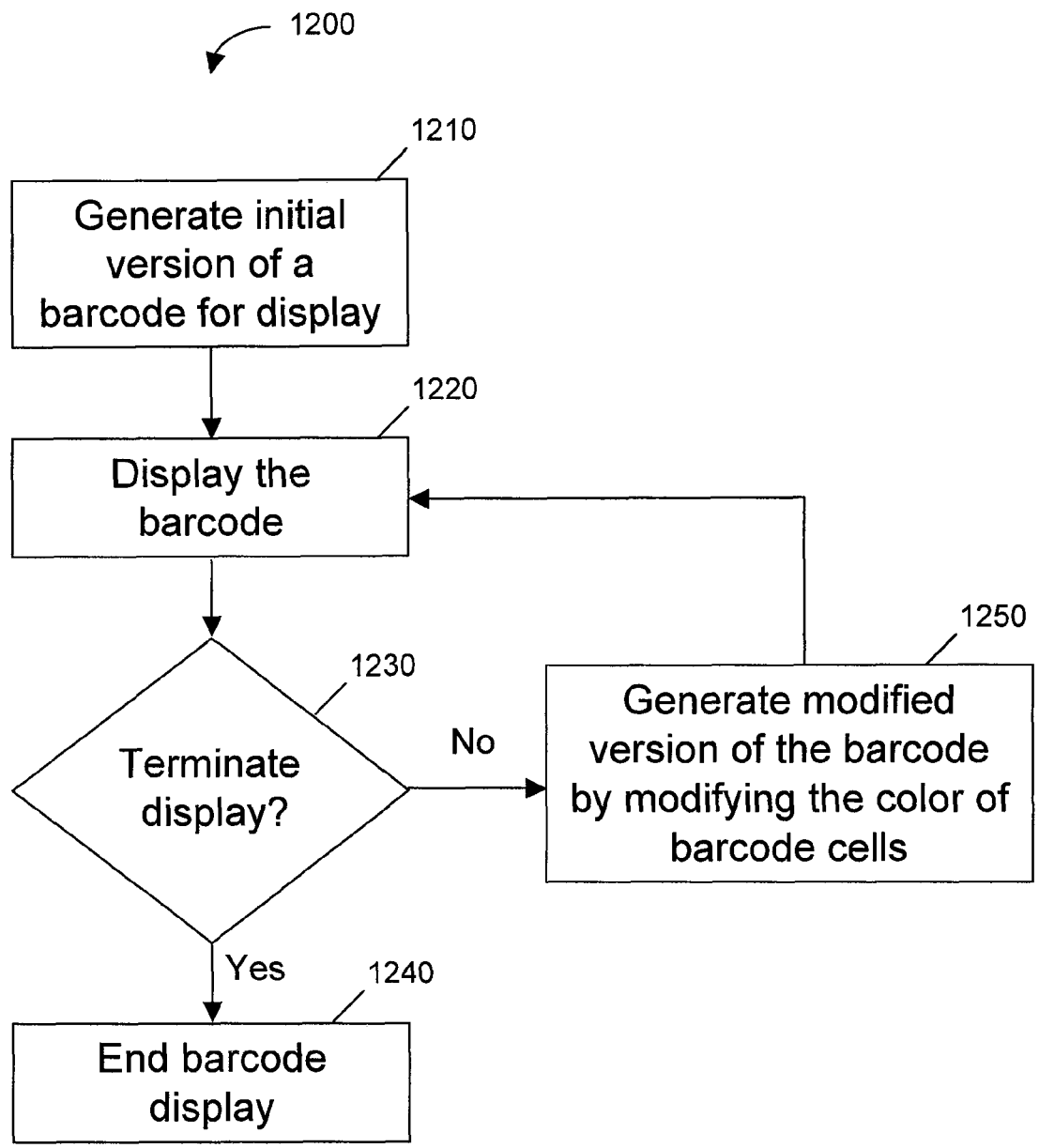
FIG. 12 is a flowchart illustrating acts of a method of displaying a barcode at a computing device, in accordance with at least one other embodiment.

FIG. 12 illustrates acts of a method 1200 that are generally analogous to the acts of method 1100 of FIG. 11. In particular, acts 1210 to 1250 are generally analogous to acts 1110 to 1150 of FIG. 11 respectively, and the reader is directed to the foregoing description in respect of FIG. 11 for further details of the acts illustrated in FIG. 12. However, in method 1200, the modified version of the barcode is generated at 1250 by modifying the color of cells used to create a barcode.

In at least one embodiment, the colors of the cells used to create a barcode are modified in a generally smooth manner, allowing the barcode to cycle through a number of versions in which the contrast between the colors in the barcode and the brightness of certain colors undergo incremental changes. It is expected that the barcode will be generally readable (e.g. at a second computing device) at one of the points in the barcode display cycle, even where certain factors may might otherwise hinder a successful reading.

In order to effect the change of the color of individual cells of the barcode, in accordance with at least one embodiment, the barcode is generated from a base pattern and a virtual layer having at least one modifiable property. For example, an opacity of the virtual layer, a color of the virtual layer, or both of these properties may be modified. By changing one or more of the properties of the virtual layer, and then applying the virtual layer to the base pattern, a modified barcode having modified colors may be generated (e.g. at 1250 of FIG. 12). The virtual layer may cover only the portion of a display screen on which the barcode is displayed, or it may cover the entire display screen. Covering the entire display screen may reduce the contrast of the overall image captured by a camera of the second computing device, for example.

In variant embodiments, the technique of using a base pattern and a virtual layer to construct a modified barcode may be employed in implementations where the barcode is not defined as pluralities of cells of different colors. For example, the barcode may be generated as a vector drawing or some other image, where the base pattern and virtual layer may still be used. More generally, the technique in which a base pattern and virtual layer are used may be employed to construct any shape that needs to be read by a machine, such as a 1-dimensional barcode, a 2-dimensional barcode, or some other kind of machine-readable shape.

In at least one embodiment, the modifications to the barcode during the barcode display cycle (e.g. as acts 1220 and 1250 are repeated) are based on a value of a time-dependent mathematical function. In some embodiments, the time-dependent mathematical function may be, for example, a continuous function (e.g. a sine or cosine function). An example implementation is described with reference to FIG. 13. The barcode may be modified at short time intervals so that the transitions between different versions of the barcode appear generally smooth throughout the barcode display cycle.

Figure 13:
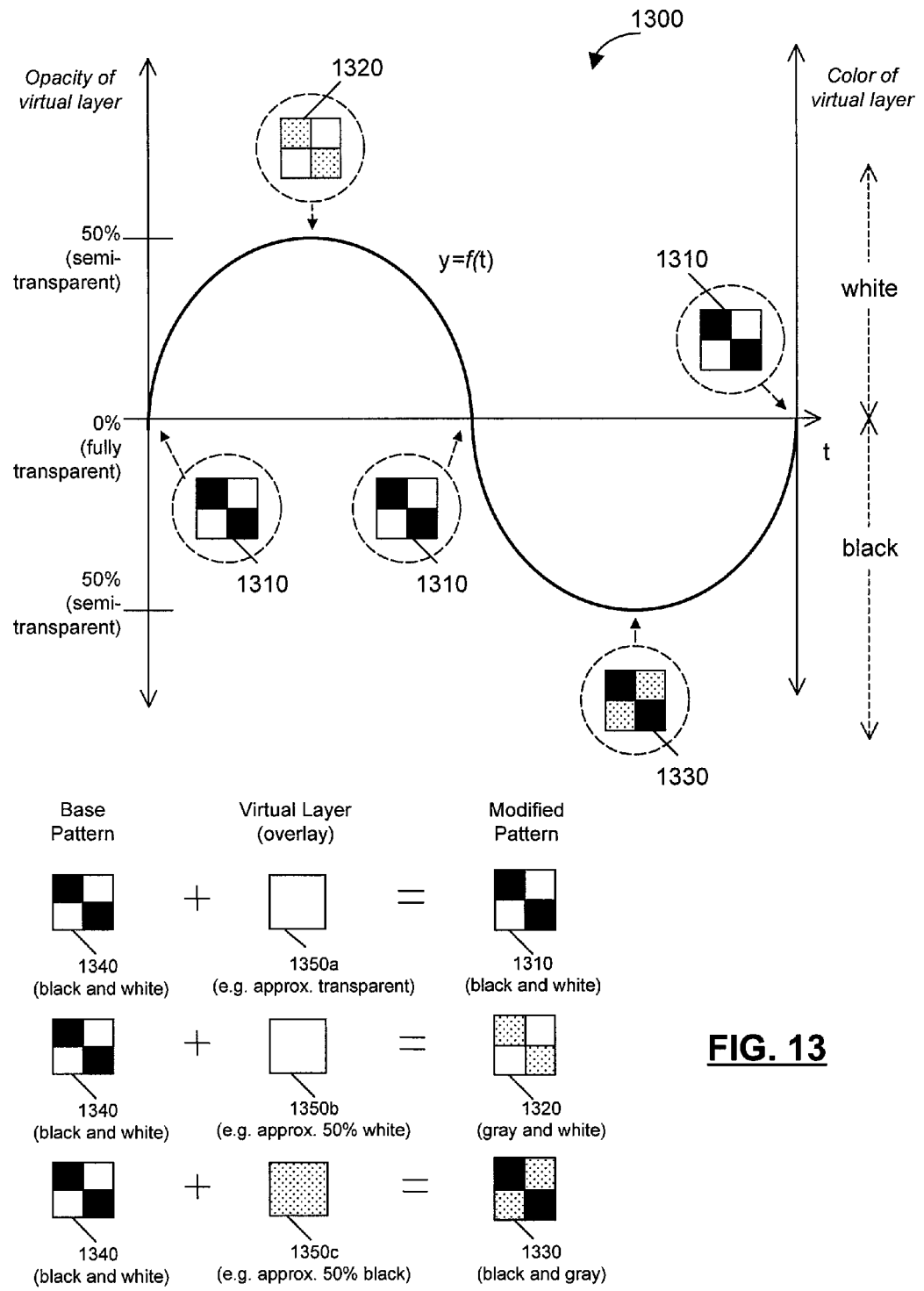
FIG. 13 is a graph illustrating how a barcode is modifiable for display, in accordance with at least one embodiment.

FIG. 13 is a graph illustrating how a barcode is modifiable for display, in accordance with at least one embodiment described herein. In this example, the time-dependent mathematical function is a sine function. By way of example only, the barcode being modified is a black-and-white barcode.

Referring to the example of FIG. 13, a level of opacity is associated with an absolute value of the sine function, and the virtual layer is generally transparent. When the sine function has a value of zero, the level of opacity of the virtual layer is approximately 0%, rendering the virtual layer fully transparent. When the sine function is at a maximum or a minimum, the level of opacity of the virtual layer is approximately 50%, rendering the virtual layer semi-transparent.

It will be understood that the level of opacity of the virtual layer associated with a zero value of the sine function may be different from approximately 0%, in variant embodiments. It will also be understood that the level of opacity of the virtual layer associated with the maximum and the minimum value of the sine function may be different from approximately 50%, in variant embodiments. It will also be understood that the level of opacity of the virtual layer associated with the maximum of the sine function, and the level of opacity of the virtual layer associated with the minimum value of the sine function need not be the same, in variant embodiments.

When the opacity of the virtual layer is modified according to the value of the sine function at a particular point in time, the virtual layer may be gradually modified from a transparent state to a semi-transparent state, and then back to the transparent state over time.

Referring again to the example of FIG. 13, the color white is associated with positive values of the sine function, and the color black is associated with negative values of the sine function. It will be understood that the colors may be reversed in variant embodiments. It will also be understood that the one or both of these colors may be different in variant embodiments.

In variant embodiments, the functionality of modifying the color of the virtual layer and the functionality of modifying the opacity of the virtual layer are independent, and need not be implemented in combination.

However, when the color of the virtual layer is modified in combination with changes in the opacity of the virtual layer, as shown in the example of FIG. 13, the virtual layer may be gradually modified from a fully transparent state to a semi-transparent state in a first color (e.g. white), then again to the fully transparent state, then to a semi-transparent state in a second color (e.g. black), and then again back to the fully transparent state over time.

As previously noted, by applying the virtual layer to the base pattern, a modified barcode having modified colors may be generated. Accordingly, the effect of the gradual modifications to the virtual layer is that different versions of a barcode may be produced over time. Reference is made again to the example illustrated in FIG. 13. At each point in time where a modified version of the barcode is to be generated (e.g. at 1250 of FIG. 12), a value of the sine function is determined. The sine function allows for a smooth interpolation between values of +1 and −1 with respect to time. Barcode version 1310 is generated when the determined value of the sine function is zero. Barcode version 1320 is generated when the determined value of the sine function is at a maximum (e.g. +1). Barcode version 1330 is generated when the determined value of the sine function is at a minimum (e.g. −1). Other barcode versions (not explicitly shown in FIG. 13) will be generated when the determined value is between zero and +1 or −1, according to the level of opacity and color of the virtual layer associated with the determined value.

The different versions of the barcodes are generated by applying the virtual layer to a base pattern 1340 associated with the barcode. In this example, base pattern 1340 represents the unmodified black-and-white version of the barcode as initially generated (e.g. at 1210 of FIG. 12). Applying the virtual layer to the base pattern 1340 can effect a change in the color of certain cells in the base pattern 1340. For example, barcode version 1310 is generated by applying a fully transparent virtual layer 1350a to the base pattern 1340, in order to provide a barcode that is generally identical with the unmodified black-and-white version of the barcode as initially generated. Accordingly, if the black-and-white of the barcode as initially generated has a strong black/white contrast, this contrast can be maintained. Barcode version 1320 is generated by applying a semi-transparent, white virtual layer 1350b to base pattern 1340, which causes the black elements of the base pattern 1340 to take on a gray color. Therefore, barcode version 1320 provides a barcode with a generally gray/white contrast (i.e. having a brighter and lower contrast compared to base pattern 1340). Barcode version 1330 is generated by applying a semi-transparent, black virtual layer 1350c to base pattern 1340, which causes the white elements of the base pattern 1340 to take on a gray color. Therefore, barcode version 1330 provides a barcode with a generally black/gray contrast (i.e. having a darker and lower contrast compared to base pattern 1340). Persons skilled in the art will understand that other barcodes (not explicitly shown in FIG. 13) will also be generated having varying intermediate levels of shade and contrast.

Accordingly, in this example, the versions of barcodes that may be generated can cycle through barcode version 1310, to barcode version 1320, back to barcode version 1310, then to barcode version 1330, and back again to barcode version 1310. This cycle may be repeated. Different versions of barcodes may be continuously generated until a signal to terminate display of the barcode is received (e.g. 1230 of FIG. 12).

In variant embodiments, the base pattern (e.g. 1340 of FIG. 13) may also be modified with time. For example, one or more colors of the base pattern may be changed after a certain period of time has elapsed (e.g. after one or more periods associated with the mathematical function have elapsed). In one example implementation, a black/white base pattern may be employed for one cycle, followed by a blue/white base pattern. In general, other time-based barcode modification sequences may be employed.

In one embodiment, a control value associated with the period or frequency of the mathematical function may be set and stored as a configuration setting at the first computing device. Depending on the frequency at which modified versions of the barcode are to be generated, the control value associated with the period or frequency of the mathematical function may affect the number of different versions of the barcode that will be generated over a given period of time, and the time required to complete an iteration of barcode versions within a barcode display cycle, for example.

Although at least some of the embodiments described herein contemplate the capture of a barcode at a computing device (e.g. a mobile device), in variant embodiments, the barcode may be captured at a device other than a computing device.

Some of the acts of a method of displaying a barcode in accordance with an embodiment described herein may be provided as executable software instructions stored on physical computer-readable storage media.

In variant implementations, some of the acts of a method of displaying a barcode in accordance with an embodiment described herein may be provided as executable software instructions stored in transmission media.

A number of embodiments have been described herein. However, it will be understood by persons skilled in the art that other variants and modifications may be made without departing from the scope of the embodiments as defined in the claims appended hereto.

The invention claimed is:

1. A method of displaying a barcode at a computing device, wherein acts of the method are performed by a processor of the computing device, and wherein the method comprises:
   generating a first version of a barcode encoding data for display on a display screen associated with the computing device;
   displaying the first version of the barcode on the display screen;
   generating a modified version of the barcode encoding the data of the first version by modifying one or more display properties associated with the barcode;
   displaying the modified version of the barcode; and
   automatically repeating said generating the modified version and said displaying the modified version, until a signal to terminate display of the barcode is received by the processor;
   wherein the barcode comprises a first plurality of cells displayed in a first color and a second plurality of cells displayed in a second color;
   wherein said modifying one or more display properties associated with the barcode comprises modifying at least one of: the first color of the first plurality of cells, or the second color of the second plurality of cells;
   wherein the barcode is generated from a base pattern, and a layer having at least one modifiable property;
   wherein said generating the modified version of the barcode comprises modifying one or more of the at least one modifiable property of the layer, and applying the layer to the base pattern;
   wherein the first color is associated with positive values of a time-dependent mathematical function;
   wherein the second color is associated with negative values of the time-dependent mathematical function; and
   wherein a level of opacity of the layer is associated with an absolute value of the time-dependent mathematical function.

2. The method of claim 1, wherein the one or more display properties comprise one or more colors in at least a part of the barcode.

3. The method of claim 1, wherein the at least one modifiable property of the layer comprises a color of the layer.

4. The method of claim 1, wherein the time-dependent mathematical function comprises a continuous function.

5. The method of claim 4, wherein the time-dependent mathematical function comprises a sine function.

6. The method of claim 4, wherein the time-dependent mathematical function comprises a cosine function.

7. The method of claim 1, wherein at said repeating, the layer is modified from a transparent state to a semi-transparent state and back to the transparent state over time.

8. The method of claim 7, wherein at said repeating, the layer is modified from a transparent state to a semi-transparent state in the first color, then to the transparent state, then to a semi-transparent state in the second color, and then to the transparent state over time.

9. The method of claim 1, further comprising:
   determining whether the signal to terminate display of the barcode is received; and
   terminating display of the barcode upon determining that the signal to terminate display of the barcode has been received.

10. The method of claim 1, wherein the signal to terminate display of the barcode is received from a second computing device.

11. The method of claim 1, wherein the signal to terminate display of the barcode is received at the computing device when generated in response to a user input.

12. The method of claim 1, wherein the one or more display properties comprise a display size of at least a part of the barcode.

13. The method of claim 1, wherein the one or more display properties comprise an orientation of the barcode.

14. The method of claim 1, wherein the computing device comprises a mobile device.

15. A computing device comprising a processor and a memory, the processor configured to execute one or more application modules, said one or more application modules comprising:
   a module configured to generate a first version of a barcode encoding data for display on a display screen associated with the computing device;
   a module configured to display the first version of the barcode on the display screen;
   a module configured to generate a modified version of the barcode encoding the data of the first version by modifying one or more display properties associated with the barcode;
   a module configured to display the modified version of the barcode; and
   a module configured to automatically repeat said generating the modified version and said displaying the modified version, until a signal to terminate display of the barcode is received by the processor;
   wherein the barcode comprises a first plurality of cells displayed in a first color and a second plurality of cells displayed in a second color;
   wherein said modifying one or more display properties associated with the barcode comprises modifying at least one of: the first color of the first plurality of cells, or the second color of the second plurality of cells;
   wherein the barcode is generated from a base pattern, and a layer having at least one modifiable property;
   wherein generating the modified version of the barcode comprises modifying one or more of the at least one modifiable property of the layer, and applying the layer to the base pattern;
   wherein the first color is associated with positive values of a time-dependent mathematical function;
   wherein the second color is associated with negative values of the time-dependent mathematical function; and
   wherein a level of opacity of the layer is associated with an absolute value of the time-dependent mathematical function.

16. The device of claim 15, wherein the at least one modifiable property of the layer comprises a color of the layer.

17. The device of claim 15, wherein the time-dependent mathematical function comprises a continuous function.

18. The device of claim 17, wherein the time-dependent mathematical function comprises a sine function.

19. The device of claim 17, wherein the time-dependent mathematical function comprises a cosine function.

20. The device of claim 15, wherein the processor is further configured to:
   determine whether the signal to terminate display of the barcode is received; and
   terminate display of the barcode upon determining that the signal to terminate display of the barcode has been received.

21. The device of claim 15, wherein the signal to terminate display of the barcode is received from a second computing device.

22. The device of claim 15, wherein the signal to terminate display of the barcode is received at the computing device when generated in response to a user input.

23. The device of claim 15, wherein the one or more display properties comprise a display size of at least a part of the barcode.

24. The device of claim 15, wherein the one or more display properties comprise an orientation of the barcode.

25. The device of claim 15, wherein the computing device comprises a mobile device.

26. A non-transitory computer readable storage medium comprising instructions that, when executed by a processor of a computing device, causes the processor to display a barcode, the instructions comprising instructions for:

generating a first version of a barcode encoding data for display on a display screen associated with the computing device;

displaying the first version of the barcode on the display screen;

generating a modified version of the barcode encoding the data of the first version by modifying one or more display properties associated with the barcode;

displaying the modified version of the barcode; and automatically repeating said generating the modified version and said displaying the modified version, until a signal to terminate display of the barcode is received by the processor;

wherein the barcode comprises a first plurality of cells displayed in a first color and a second plurality of cells displayed in a second color;

wherein said modifying one or more display properties associated with the barcode comprises modifying at least one of: the first color of the first plurality of cells, or the second color of the second plurality of cells;

wherein the barcode is generated from a base pattern, and a layer having at least one modifiable property;

wherein said generating the modified version of the barcode comprises modifying one or more of the at least one modifiable property of the layer, and applying the layer to the base pattern;

wherein the first color is associated with positive values of a time-dependent mathematical function;

wherein the second color is associated with negative values of the time-dependent mathematical function; and wherein a level of opacity of the layer is associated with an absolute value of the time-dependent mathematical function.

* * * * *